(12) United States Patent
Buono

(10) Patent No.: US 8,460,587 B2
(45) Date of Patent: Jun. 11, 2013

(54) METHOD FOR PRODUCING A FOAMED ARTICLE

(75) Inventor: Fabrizio Buono, Turin (IT)

(73) Assignee: Tecnocad Progetti S.p.A., Torin (IT)

(*) Notice: Subject to any disclaimer, the term of this patent is extended or adjusted under 35 U.S.C. 154(b) by 178 days.

(21) Appl. No.: 13/175,780

(22) Filed: Jul. 1, 2011

(65) Prior Publication Data
US 2013/0001819 A1 Jan. 3, 2013

(51) Int. Cl.
*B29C 67/20* (2006.01)

(52) U.S. Cl.
USPC ......... 264/46.8; 264/46.4; 264/511; 264/516; 264/546; 264/553; 264/554; 264/571; 264/257; 264/259; 264/261; 264/266; 264/267; 264/324; 264/325

(58) Field of Classification Search
USPC ............... 264/46.4, 46.8, 511, 516, 546, 553, 264/554, 571, 257, 259, 261, 266, 267, 324, 264/325
See application file for complete search history.

(56) References Cited

U.S. PATENT DOCUMENTS
4,987,666 A 1/1991 Smith

FOREIGN PATENT DOCUMENTS
DE 102004023582 A2 12/2005
EP 0965425 A2 12/1999
EP 2003089 A2 12/2008
FR 2882959 A1 9/2006

OTHER PUBLICATIONS
European Search Report for application No. 10425159.0 dated Oct. 29, 2010.

*Primary Examiner* — Christina Johnson
*Assistant Examiner* — Saeed Huda
(74) *Attorney, Agent, or Firm* — Patterson & Sheridan, L.L.P.

(57) ABSTRACT

A method for producing a foamed article including a supporting element, a foam layer, and an upholstery cover applied on said foam layer, comprising the steps of forming said upholstery cover by stitching together a plurality of lengths of upholstery cover, positioning the sewn upholstery cover on a convex positioning surface of a positioning member withholding the sewn upholstery cover on said positioning member by means of a first suction system, setting said positioning member with the sewn upholstery cover withheld thereon by suction in a bottom die of a foaming die, deactivating said first suction system and withholding the upholstery cover on a concave positioning surface of said bottom die by means of a second suction system, extracting said positioning member from said bottom die leaving said upholstery cover positioned and withheld by suction on said concave positioning surface, positioning a rigid supporting element on a plunger of said foaming die and closing the plunger on said bottom die so as to form a foaming cavity between an outer surface of said supporting element and said upholstery cover; and injecting foaming material in said foaming cavity and polymerizing the foaming material.

3 Claims, 6 Drawing Sheets

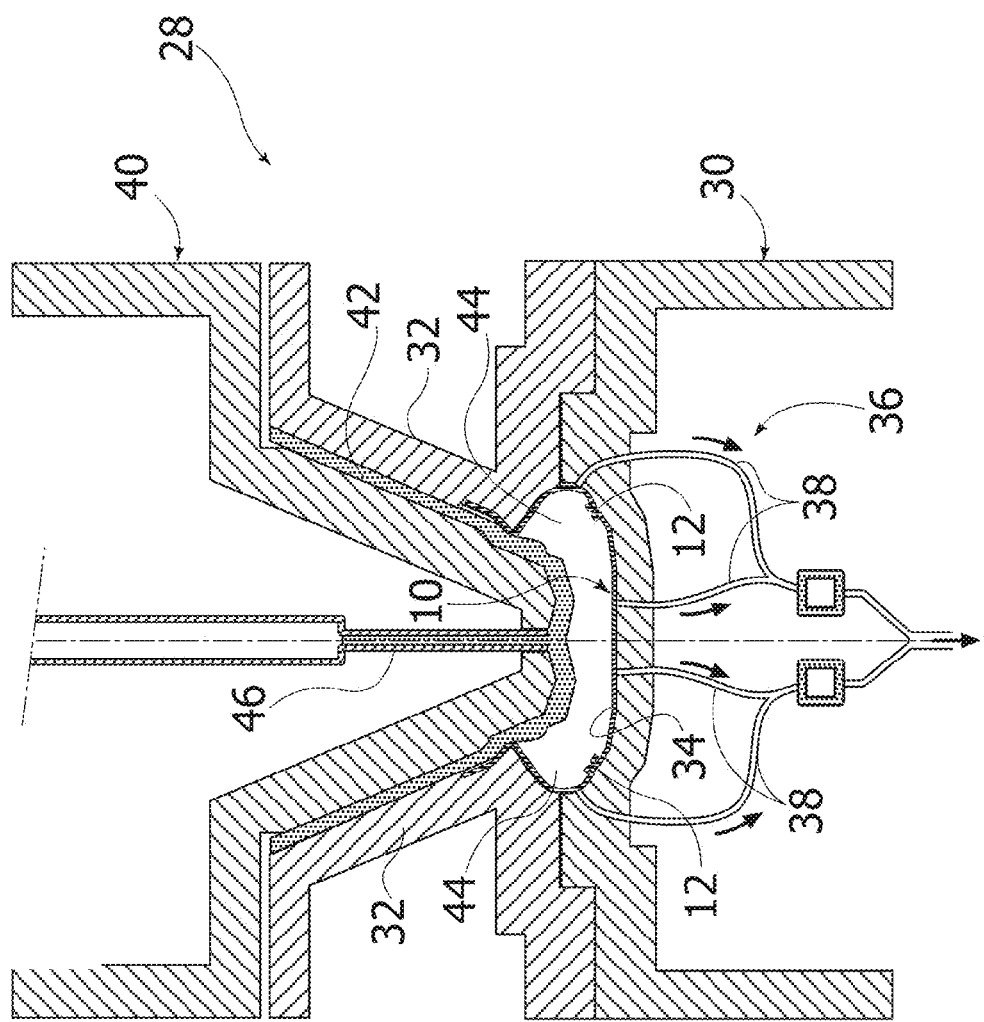

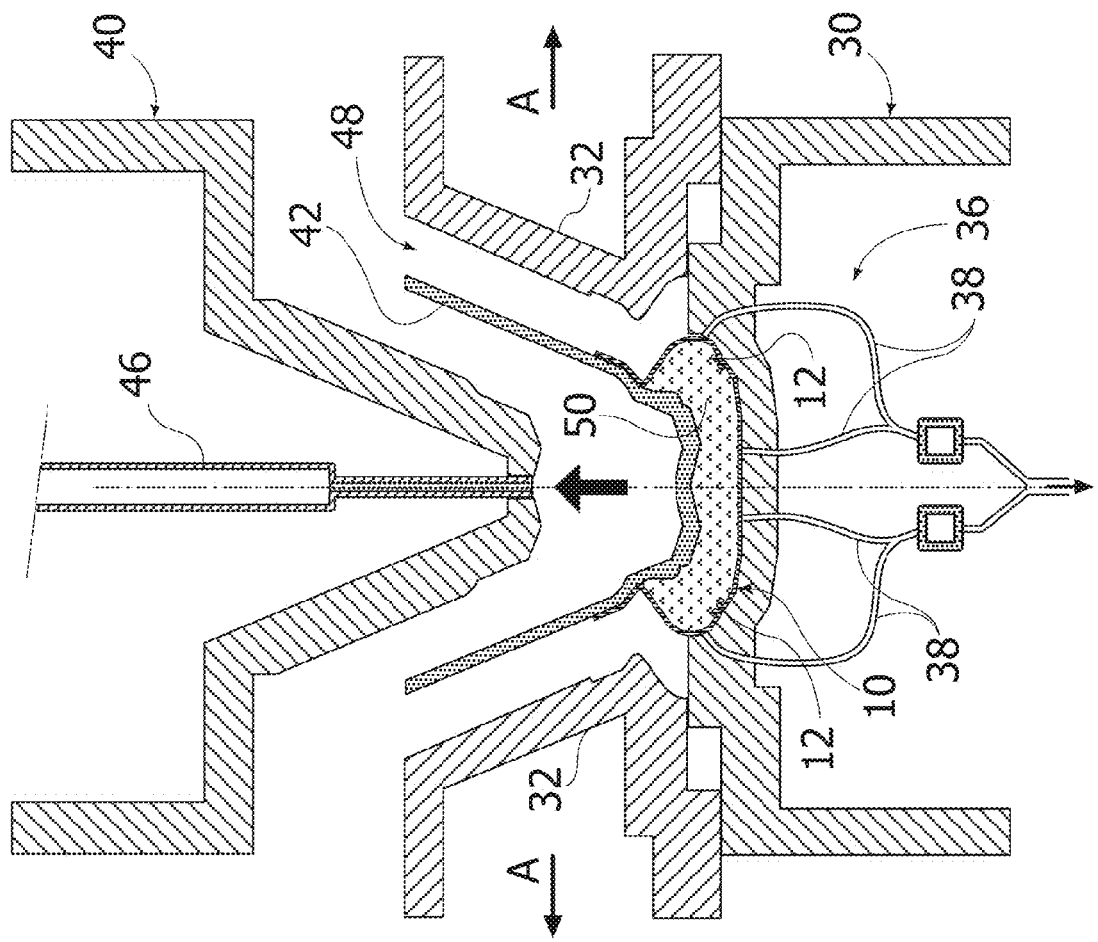

METHOD FOR PRODUCING A FOAMED ARTICLE

BACKGROUND OF THE INVENTION

1. Field of the Invention

The present invention relates to a method for producing a foamed article that includes a supporting element, a layer of foamed material, and a sewn upholstery cover applied on the layer of foamed material.

The present invention has been developed with particular regard to the field of production of foamed articles for vehicles, such as for example dashboards, upholstered panels for doors and the like. The invention relates in particular to the production of foamed articles provided with upholstery covers made of natural leather or fabric, or sewn quality upholstery covers.

2. Description of the Related Art

Foamed articles for vehicles, such as for example certain dashboards, comprise a supporting element made of rigid plastic material, an upholstery covering and a layer of foamed plastic material set between the upholstery covering and the supporting element made of rigid plastic material. The production of articles of this sort is obtained using a foaming die including a bottom die and a plunger, which, in a closed position, define a foaming cavity, injected and polymerized in which is a plastic foaming material, usually a polyurethane foam.

In the majority of cases, the upholstery cover is not of a sewn type. When the upholstery cover is not of a sewn type, it is applied on a positioning surface of the bottom die of the foaming die and is withheld in contact with said surface by suction. The supporting element of rigid plastic material is positioned on the plunger and the foaming die is closed. Foaming material is then injected in a foaming cavity formed between the upholstery cover and the supporting element.

In the case of particularly high-quality foamed articles, the upholstery cover is formed by cutting and sewing of a plurality of lengths of upholstery cover of quality material, such as for example natural leather, fabric, or embroidered covers. In these cases, it is not possible to use the method envisaged for non-sewn upholstery covers. The main problem in the case of sewn upholstery covers is the precise positioning of the rows of stitching (which have a major importance from the aesthetic standpoint) on the surface of the foamed article. The method used with non-sewn upholstery covers, which envisages setting the upholstery cover on the surface of the bottom die, is not able to ensure the precision necessary for positioning of the rows of stitching of the upholstery cover with respect to the finished article.

When it becomes necessary to provide an upholstery cover for dashboards or other foamed articles for vehicles according to the known art a foamed article is first produced without upholstery cover, and then the sewn upholstery cover is applied on the foamed article with additional operations of upholstery that envisage the use of glue for fixing the sewn upholstery cover on the layer of foamed material. These operations are basically of an artesanal nature and involve a high cost. Another drawback of the known art is that in order to provide vehicles with standard furnishing having non-sewn upholstery covers and with optional furnishing having sewn upholstery covers made of quality material, the automobile company must provide two different foaming dies; otherwise, the components with quality upholstery cover would have a greater thickness than those with non-sewn upholstery covers and would not be compatible with the housings of the foamed article provided according to design.

SUMMARY OF THE INVENTION

The object of the present invention is to provide a method for producing a foamed article with a sewn upholstery cover that will enable to overcome the problems of the known art.

According to the present invention, said object is achieved by a method having the characteristics forming the subject of claim 1.

BRIEF DESCRIPTION OF THE DRAWINGS

The present invention will now be described in detail with reference to the attached drawings, which are provided purely by way of non-limiting example, where FIGS. 1 to 6 are schematic cross sections illustrating the sequence of the steps of a method according to the present invention.

DETAILED DESCRIPTION

The method according to the present invention envisages in a first step formation of an upholstery cover 10 obtained by cutting and stitching together a plurality of lengths of upholstery cover 10', 10", 10'''. The lengths of upholstery cover 10', 10", 10''' can be made of natural leather, fabric or other high-quality upholstery cover materials. The rows of stitching between the lengths of upholstery cover 10', 10", 10''' are designated by 12.

Figure 1:
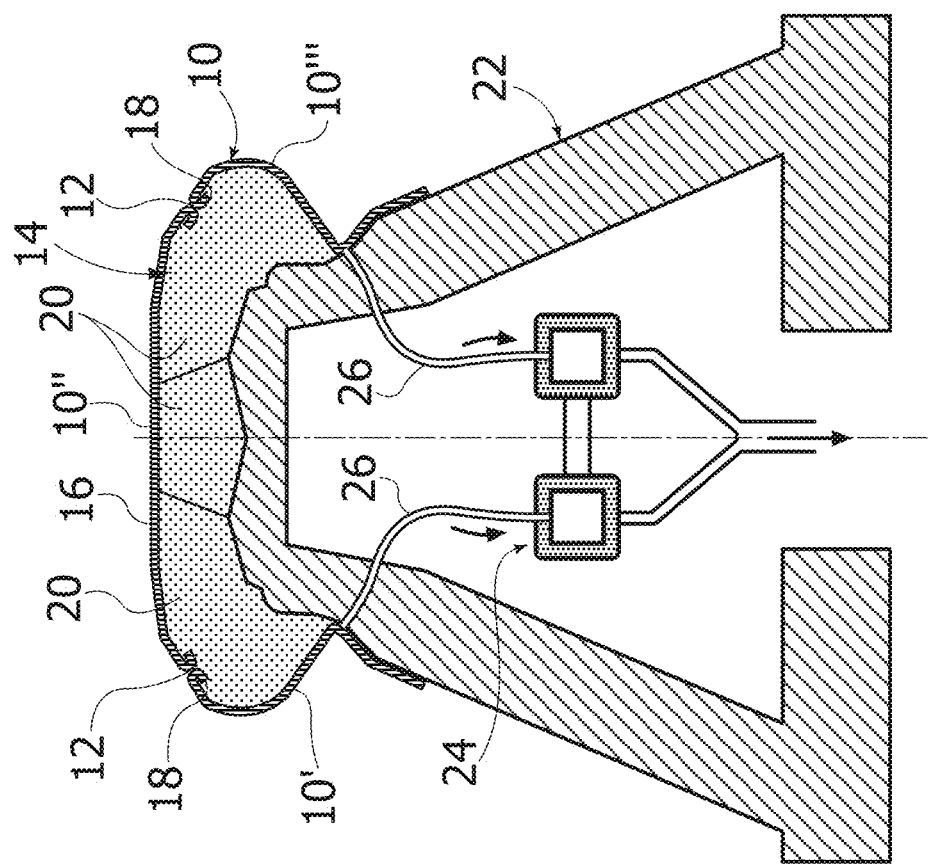

As illustrated in FIG. 1, the sewn upholstery cover 10 is positioned on a positioning member 14 having a convex positioning surface 16. The rows of stitching 12 of the upholstery cover 10 are arranged in corresponding seats provided on the convex positioning surface 16. Preferably, the positioning member 14 is formed by a series of separable sectors 20. The positioning member 14 is carried by a mobile support 22. The mobile support 22 carries a suction system 24 provided with suction ducts 26 that communicate with the convex positioning surface 16. The suction system 24 creates a negative pressure between the upholstery cover 10 and the convex positioning surface 16. Said negative pressure withholds the sewn upholstery cover 10 on the convex positioning surface 16 in the exact position in which it has been laid.

Figure 2:
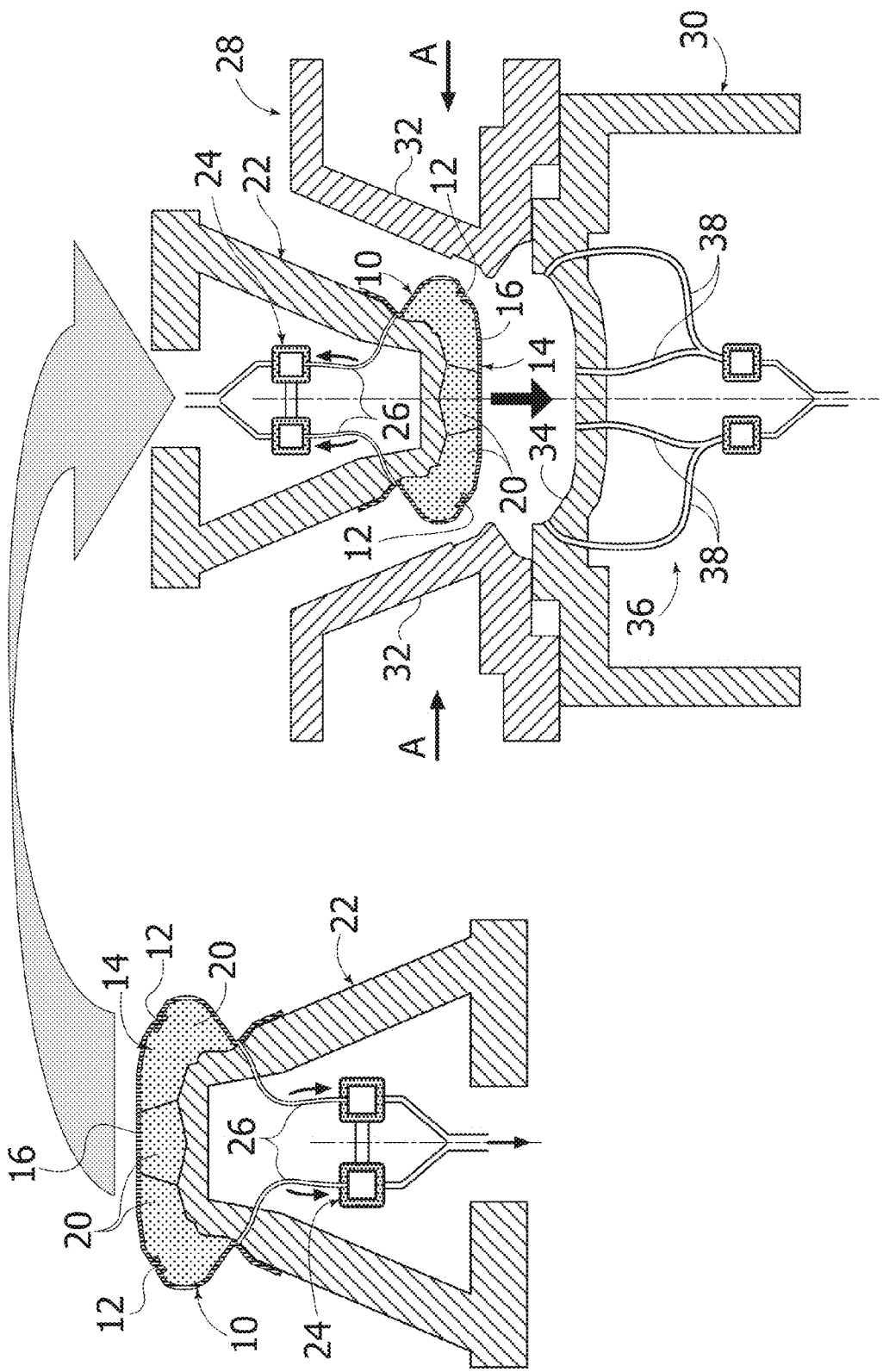

In the next step, illustrated in FIG. 2, the mobile support 22 is translated manually or automatically for setting the positioning member 14 with the sewn upholstery cover 10 withheld thereon in the bottom die 28 of a foaming die. In the example illustrated, the bottom die 28 comprises a fixed part 30 and two mobile parts 32 that can move between an open position and a closed position in the direction indicated by the double-headed arrows A. The bottom die 28 has a concave positioning surface 34, on which there is to be positioned the upholstery cover 10. The bottom die 28 has a second suction system 36 provided with ducts 38 connected to the concave positioning surface 34.

Figure 3:
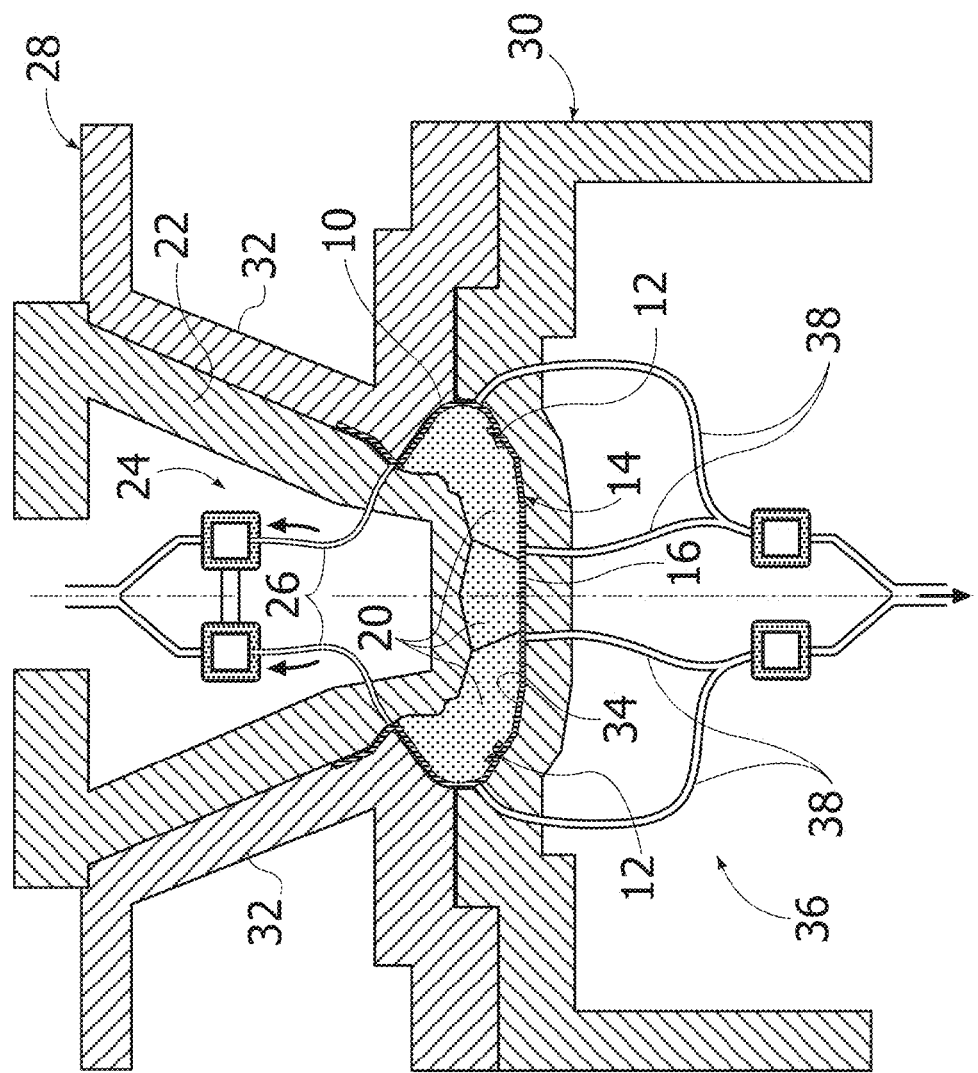

As illustrated in FIG. 3, the positioning member 14 rests on the concave positioning surface 34 of the fixed part 30 of the bottom die 28. The mobile parts 32 are then closed so as to bring the bottom die 28 into the configuration of FIG. 3. In this configuration, the upholstery cover 10 rests externally on the concave positioning surface 34 and is withheld internally by the convex positioning surface 16 of the positioning member 14.

As long as the positioning member 14 is inserted and withheld in the bottom die 28, the upholstery cover 10 is withheld by suction on the convex positioning surface 16. When the positioning member 14 is in the position illustrated in FIG. 3, the first suction system 24 is deactivated, and immediately afterwards the second suction system 36 is activated. In this way, the upholstery cover 10 is withheld by suction in contact with the concave positioning surface 34 of the bottom die 28.

Figure 4:
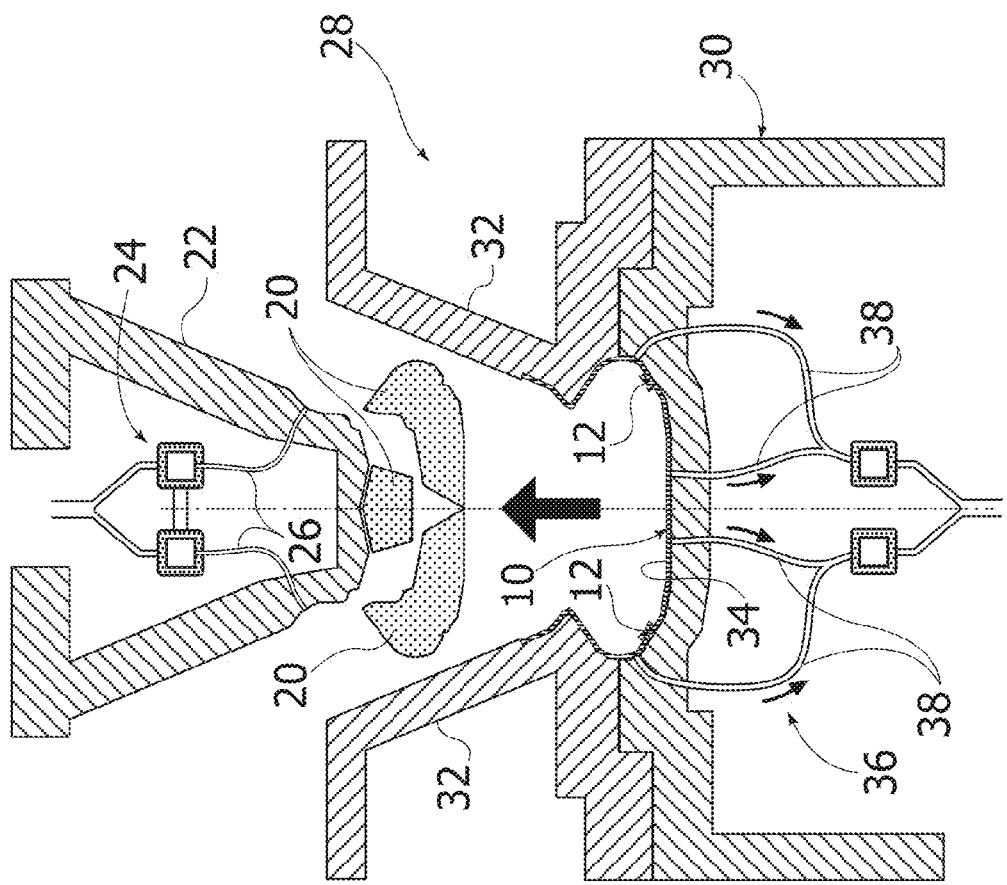

In the next step (illustrated in FIG. 4), the positioning member 14 is extracted from the bottom die 28, leaving the upholstery cover 10 positioned and withheld by suction on the concave positioning surface 34 of the bottom die 28. In the case where the concave positioning surface 34 has the form of an undercut as illustrated in the figures, the sectors 20 that make up the positioning member 14 are taken apart as illustrated in FIG. 4 to enable extraction of the positioning member 14 from the bottom die 28 without opening the mobile parts 32.

Next, a plunger 40 of the foaming die bearing a supporting element 42 made of rigid plastic material is closed on the bottom die 28, as illustrated in FIG. 5. In the condition where the plunger 40 is positioned on the bottom die 28 a foaming cavity 44 is defined between a portion of outer surface of the supporting element 42 and the upholstery cover 10. The plunger 40 is connected to an injection channel 46 that communicates with the foaming cavity 44 through one or more holes provided in the supporting element 42. A foamable material, for example a polyurethane foam, is injected in the foaming cavity 44 through the injection channel 46. The foamable material polymerizes in the foaming cavity 44 and adheres firmly to the supporting element 42 and to the internal surface of the upholstery cover 10.

In the last step (illustrated in FIG. 6), the plunger 40 is raised, and the mobile parts 32 of the bottom die 28 are opened and the suction through the second suction system 36 is interrupted.

With the method described a foamed article 48 is obtained, formed by a supporting element 42 of rigid plastic material provided with a sewn upholstery cover 10 and a foam layer 50 that joins the sewn upholstery cover 10 to the supporting element 42. Fixing the sewn upholstery cover 10 is obtained by adhesion to the foam layer 50. The sewn upholstery cover 10 is positioned with precision with respect to the foam layer 50. The overall thickness of the foam layer 50 of the upholstery cover 10 is substantially identical to the overall thickness of a foamed article with non-sewn upholstery cover. With the method according to the present invention the same foaming die can be used for producing foamed articles with non-sewn upholstery cover and with sewn upholstery cover.

The solution according to the present invention avoids the application of sewn upholstery covers with operations of upholstery and avoids the use of glue for fixing the upholstery cover to the foam layer.

While the foregoing is directed to embodiments of the present invention, other and further embodiments of the invention may be devised without departing from the basic scope thereof, and the scope thereof is determined by the claims that follow.

The invention claimed is:

1. A method for producing a foamed article including a supporting element, a foam layer, and an upholstery cover applied on said foam layer, comprising the steps of:

forming said upholstery cover by stitching together a plurality of lengths of upholstery cover, positioning the sewn upholstery cover on a convex positioning surface of a positioning member, withholding the sewn upholstery cover on said positioning member by means of a first suction system, setting said positioning member with the sewn upholstery cover withheld thereon by suction in a bottom die of a foaming die, deactivating said first suction system and withholding the upholstery cover on a concave positioning surface of said bottom die by means of a second suction system, extracting said positioning member from said bottom die leaving said upholstery cover positioned and withheld by suction on said concave positioning surface, positioning a rigid supporting element on a plunger of said foaming die and closing the plunger on said bottom die so as to form a foaming cavity between an outer surface of said supporting element and said upholstery cover, and injecting foaming material into said foaming cavity and polymerizing the foaming material.

2. The method according to claim 1, wherein said positioning member comprises a plurality of sectors separable and wherein said sectors are detached from one another to enable extraction of said positioning member from said bottom die.

3. The method according to claim 1, wherein rows of stitching of said upholstery cover are inserted within corresponding seats formed on said convex positioning surface of said positioning member.

* * * * *